(12) United States Patent
Seacord et al.

(10) Patent No.: US 12,336,061 B2
(45) Date of Patent: Jun. 17, 2025

(54) HEATED BLANKET

(71) Applicant: Neptech, Inc., Highland, MI (US)

(72) Inventors: Michael P. Seacord, Davisburg, MI (US); Laurence C. Begin, Milford, MI (US)

(*) Notice: Subject to any disclaimer, the term of this patent is extended or adjusted under 35 U.S.C. 154(b) by 1069 days.

(21) Appl. No.: 17/203,676

(22) Filed: Mar. 16, 2021

(65) Prior Publication Data
US 2021/0289589 A1    Sep. 16, 2021

Related U.S. Application Data

(60) Provisional application No. 62/990,207, filed on Mar. 16, 2020.

(51) Int. Cl.
| H05B 3/14 | (2006.01) |
| A47G 9/02 | (2006.01) |
| G05D 23/24 | (2006.01) |
| H05B 3/18 | (2006.01) |
| H05B 3/34 | (2006.01) |

(52) U.S. Cl.
CPC .......... *H05B 3/145* (2013.01); *A47G 9/0215* (2013.01); *A47G 9/0223* (2013.01); *G05D 23/24* (2013.01); *H05B 3/18* (2013.01); *H05B 3/342* (2013.01); *H05B 2203/009* (2013.01); *H05B 2203/011* (2013.01); *H05B 2203/017* (2013.01); *H05B 2203/02* (2013.01)

(58) Field of Classification Search
CPC .... A47G 9/0215; A47G 9/0223; H05B 3/145; H05B 3/342; H05B 3/34; H05B 3/18; H05B 3/146; H05B 2203/009; H05B 2203/011; H05B 2203/013; H05B 2203/02; H05B 2203/017; G05D 23/24; G05D 23/20
USPC ......................................................... 219/212
See application file for complete search history.

(56) References Cited

U.S. PATENT DOCUMENTS

| 3,107,152 | A | * | 10/1963 | Ford | F24D 13/02 252/502 |
| 3,238,355 | A | * | 3/1966 | Van Eeck | H05B 3/146 219/544 |
| 3,412,358 | A | * | 11/1968 | Hummel | H05B 3/145 338/210 |
| 3,472,289 | A | * | 10/1969 | Riordan | D02G 3/441 219/202 |
| 3,697,728 | A | * | 10/1972 | Stirzenbecher | B64D 13/08 219/466.1 |
| 3,808,403 | A | * | 4/1974 | Kanaya | H05B 3/342 338/211 |
| 3,876,968 | A | * | 4/1975 | Barnes | H05B 3/342 252/511 |
| 3,947,658 | A | * | 3/1976 | Sato | H02H 5/043 392/432 |
| 4,017,715 | A | * | 4/1977 | Whitney | H05B 3/146 264/105 |
| 4,031,356 | A | * | 6/1977 | Niibe | H02H 5/10 219/541 |
| 4,032,751 | A | * | 6/1977 | Youtsey | H05B 3/146 338/211 |

(Continued)

*Primary Examiner* — Eric S Stapleton
(74) *Attorney, Agent, or Firm* — L.C. BEGIN & ASSOCIATES, PLLC

(57) ABSTRACT

A heated blanket is presented that includes a self-regulating heating element contained therein for uniform heating of the heated blanket.

20 Claims, 3 Drawing Sheets

(56) References Cited

U.S. PATENT DOCUMENTS

| | | | | |
|---|---|---|---|---|
| 4,060,710 A * | 11/1977 | Reuter | H05B 3/00 | 252/514 |
| 4,149,066 A * | 4/1979 | Niibe | H05B 3/36 | 219/505 |
| 4,158,078 A * | 6/1979 | Egger | B32B 27/12 | 428/408 |
| 4,177,376 A * | 12/1979 | Horsma | H05B 3/06 | 219/505 |
| 4,310,745 A * | 1/1982 | Bender | H05B 3/34 | 392/435 |
| 4,330,703 A * | 5/1982 | Horsma | B29C 66/9192 | 219/505 |
| 4,534,886 A * | 8/1985 | Kraus | D04H 1/4334 | 252/502 |
| 4,543,474 A * | 9/1985 | Horsma | H01C 7/027 | 264/105 |
| 4,654,511 A * | 3/1987 | Horsma | H05B 3/146 | 219/548 |
| 4,668,857 A * | 5/1987 | Smuckler | H01C 7/027 | 219/549 |
| 5,198,639 A * | 3/1993 | Smuckler | H05B 3/146 | 219/219 |
| 6,073,998 A * | 6/2000 | Siarkowski | A47C 7/748 | 297/219.11 |
| 6,084,206 A * | 7/2000 | Williamson | H05B 3/148 | 219/548 |
| 6,423,951 B1 * | 7/2002 | Elsasser | H05B 3/06 | 219/544 |
| 6,653,607 B2 * | 11/2003 | Ellis | A61F 7/007 | 219/217 |
| 8,138,457 B2 * | 3/2012 | Seo | H05B 3/286 | 219/217 |
| 8,283,602 B2 * | 10/2012 | Augustine | A61F 7/007 | 219/217 |
| 9,095,008 B1 * | 7/2015 | Seacord | H05B 3/34 | |
| 2002/0003136 A1 * | 1/2002 | Williamson | H05B 3/36 | 219/548 |
| 2002/0038801 A1 * | 4/2002 | Laken | B29C 51/02 | 219/544 |
| 2002/0043525 A1 * | 4/2002 | Laken | B29C 51/02 | 219/386 |
| 2002/0117495 A1 * | 8/2002 | Kochman | F24D 13/024 | 219/549 |
| 2003/0189037 A1 * | 10/2003 | Kochman | H05B 3/58 | 219/549 |
| 2008/0083720 A1 * | 4/2008 | Gentile | A43B 3/35 | 219/211 |
| 2008/0083721 A1 * | 4/2008 | Kaiserman | H05B 3/342 | 219/211 |
| 2008/0083740 A1 * | 4/2008 | Kaiserman | A43B 3/35 | 219/520 |
| 2008/0223844 A1 * | 9/2008 | Cronn | H05B 3/342 | 36/2.6 |
| 2008/0230530 A1 * | 9/2008 | Augustine | H05B 3/347 | 219/548 |
| 2010/0161016 A1 * | 6/2010 | Augustine | A61F 7/0097 | 607/112 |
| 2010/0176118 A1 * | 7/2010 | Lee | H05B 3/34 | 219/549 |
| 2012/0312797 A1 * | 12/2012 | Augustine | A61F 7/007 | 219/212 |
| 2014/0353300 A1 * | 12/2014 | Swiatek | H05B 3/34 | 219/211 |
| 2015/0230524 A1 * | 8/2015 | Stevens | H05B 1/02 | 219/494 |
| 2017/0086513 A1 * | 3/2017 | Maxey | A41D 1/04 | |
| 2017/0158898 A1 * | 6/2017 | Xiao | C09D 11/104 | |
| 2018/0103694 A1 * | 4/2018 | Fortenbacher | A41D 13/0051 | |
| 2018/0302952 A1 * | 10/2018 | Cubon | H05B 3/146 | |
| 2018/0376539 A1 * | 12/2018 | Augustine | H05B 3/342 | |

* cited by examiner

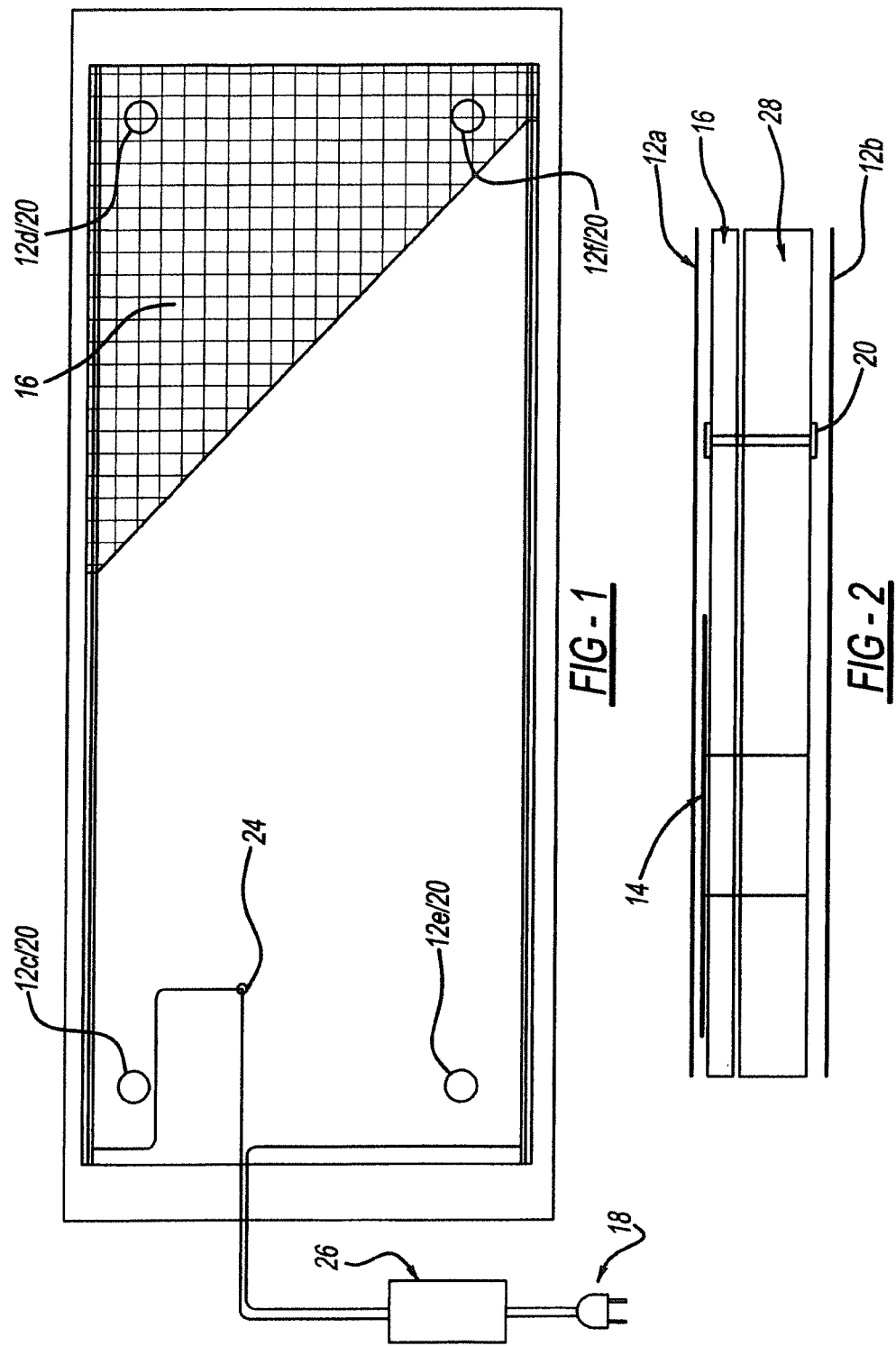

HEATED BLANKET

CROSS-REFERENCE TO RELATED APPLICATIONS

This application claims the benefit of U.S. Provisional Application Ser. No. 62/990,207, having a filing date of Mar. 16, 2020.

BACKGROUND

A heated blanket is presented for use in industrial applications such as the automotive, chemical, or other industrial settings. Oftentimes, bulk fluids or chemicals are stored in 5-gallon buckets, 55-gallon drums, 400-gallon totes, or in other conventionally-sized containers whereby the applicability, the consistency, and/or the efficacy of the fluid may be compromised as it cools below temperatures normally recommended for its use. In particular, although not thereby limited, an exemplary use of the present blanket is for the maintenance of a residual temperature of chemicals typically stored perhaps outside, in warehouses, or in other areas where the storage area is not necessarily heated.

Accordingly, the blanket is contemplated for use in a wrap-around configuration for example. As such, a 55-gallon drum of chemical such as a polymeric blend, or an oil-based fluid might include a heated blanket secured about its periphery. In this way, the temperature may be maintained at a predetermined temperature or temperature range as per the manufacturer's recommendations, or at a temperature that does not compromise the safe handling or storage of the bulk fluid or chemical. Other uses for the present blanket are also contemplated and include ground thawing applications, concrete curing applications, material curing applications, work mats, and so forth.

Certain challenges exist with the current state-of-the-art heated blankets. For example, ensuring safe heating of the blanket with the heating element is one concern. Secondly, ensuring substantially uniform heating across the surface of the heating blanket is yet another concern. Additionally, ensuring that the heated blanket is properly controlled to ensure heating within the desired range is yet another challenge.

BRIEF DESCRIPTION OF THE DRAWINGS

FIG. 1 is a schematic view of a blanket formed in accordance with the present invention.

FIG. 2 is a cross-section of FIG. 1.

SUMMARY OF THE INVENTION

Figure 3:
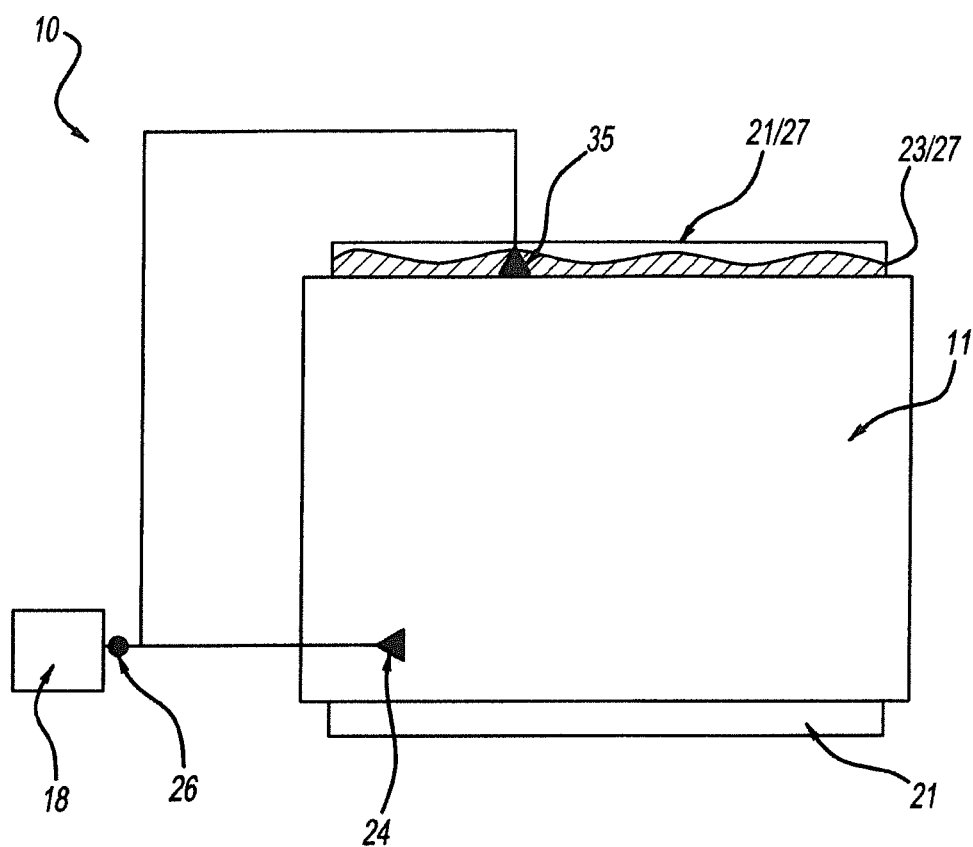
FIG. 3 is a schematic diagram of a blanket interfacing with a storage vessel for a desired chemical, wherein control of the bulk fluid temperature is illustrated.

A heated blanket is presented that includes a self-regulating heating element, having a carbon conductor for example, for uniform heating of the heated blanket. Also presented is a system for heating an article including the aforementioned heated blanket and an optional thermostat for measuring the temperature of an article to be heated. As the temperature of the article departs from a preset temperature range, the thermostat controls power to the heated blanket thereby either completing or interrupting the electrical supply to the heated blanket depending on whether the article must be cooled or warmed.

Stated another way, the invention may be described as a heating system containing a blanket for heating an article; a first outer panel of the blanket defining an area having a first region or corner, a second region or corner, a third region or corner, and a fourth region or corner; a heating element of the blanket proximate to or adjacent to the first outer panel and substantially coextensive with the area defined by the first outer panel, wherein the heating element may be fixed to the first outer panel on at least one of the first, second, third, and fourth corners; a power source such as a 110 amp source in electronic communication with the heating element; a second outer panel of the blanket adjacent to the heating element and substantially coextensive with the area defined by the first outer panel, the second outer panel joined to the first outer panel; and an optional first thermostat in thermal communication with an article to be heated by the blanket, the first thermostat in electronic communication with the power supply.

DETAILED DESCRIPTION OF THE INVENTION

A heating system 10 contains a heatable blanket 11 as shown in FIG. 1. The blanket 11 includes a cover or casing 12 that includes an outer panel 12a and an inner panel 12b, and may if desired be weather resistant (e.g., waterproof), and/or heat and/or fire resistant (e.g., made from a fire-retardant material), for example. A cross-section of FIG. 1 is presented as FIG. 2. The cover 12 may be formed from vinyl, silicone cloth, fiberglass cloth, or from trade materials known as Cordura® or Kevlar®, for example. The particular application will determine the cover 12 material, as will be appreciated by one of ordinary skill in the art. As shown in the FIGURES, an exemplary blanket 11 includes a first outer panel or layer 12 containing a material such as vinyl, or any other suitable covering for the blanket 11. The first outer panel 12 surrounds and preferably seals most of the other constituents of the blanket 11, and thereby functions as a housing. A second layer 14 may be provided and may be juxtaposed to the first outer layer 12 and formed from a foil material such as an adhesive foil pad. The foil material 14 forms an insulating barrier between the first layer 12a and other layers described below.

A third layer 16 may be juxtaposed to the second layer 14 and is radially inward therefrom, whereby the second layer 14 is sandwiched between the first layer 12a and the third layer 16. In an alternative embodiment, the third layer 16 may be "proximate" to the first outer layer 12, in the event the second layer 14 is not utilized. When used in this context, the term "proximate" is meant to denote and convey that the third layer 16 is either immediately adjacent (juxtaposed) to outer layer 12, or, that it is near but perhaps not immediately adjacent to layer 12. For example, layer 14 may be sandwiched between layers 12 and 16 and layer 16 may still be described as being "proximate" to layer 12. The third layer 16 is a conductive and/or radiating heating material/element that emanates heat as electricity is passed therethrough.

Figure 4:
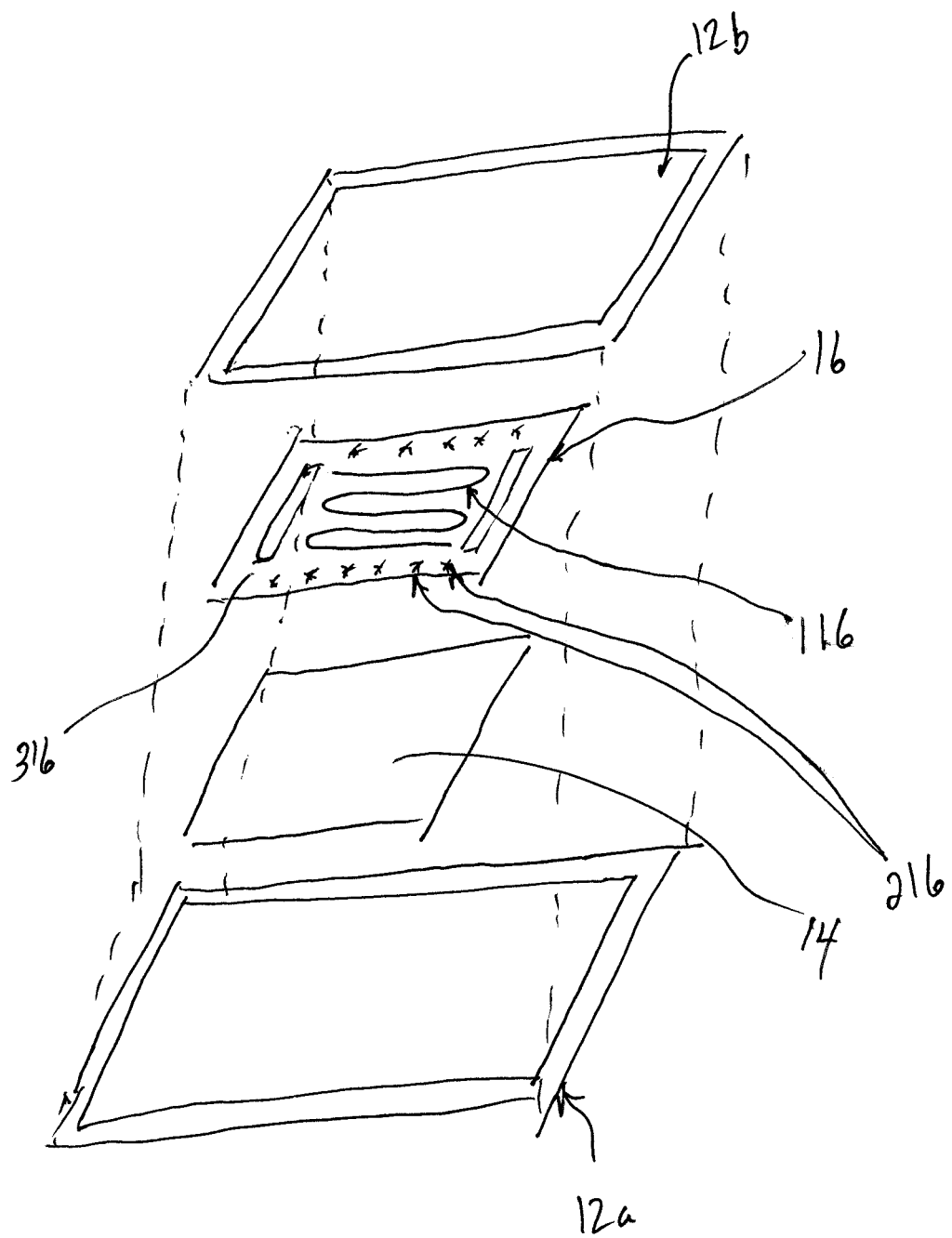
FIG. 4 is an exploded diagram of a heat-welded blanket, in accordance with the present invention.

In accordance with the present invention, and as exemplified in FIG. 4, an exemplary material useful as the third layer/heating element 16 may be a polymeric sheet containing a carbon or nanocarbon deposition on the polymeric sheet wherein the heating element 16 therefore contains a carbon heating element 116, such as carbon black or graphite, that is printed or otherwise deposed on or within a polymeric film 316 containing an insulator 216. Unlike many heating elements, during operation, the conductive heating element 16 thereby provides uniform heating across the area of the polymeric sheet. The third layer or carbon polymeric heating element 16 may be purchased for example from Guandong Warmtact Electrical Heating Technology Co., Ltd. of China, or other known suppliers. An electrical power source 18 is configured with the third layer/heating element 16 in a known manner to provide power throughout conductors of the polymeric heating element 16. As shown in FIG. 1, the electrical source is an AC source of 120 VAC, but other sources such as an AC source of 220 VAC, or a battery source having 12/24 VDC may also be employed, as will be appreciated by one of ordinary skill in the art. A preferred heat element layer 16 may therefore be formed as some carbon composite conductor encased within or deposited upon a polymeric sheet such as described within but not limited to U.S. Pat. Nos. 7,520,049 and 3,412,358, each incorporated herein by reference in their entirety. It will be appreciated that the polymeric heat element layer 16 will have a predetermined thermo-conductivity that may be iteratively determined based on the power applied and based on the type of polymer encasement, and also based on the thickness of the polymeric substrate. Stated another way, the polymeric heating element 16 such as a carbon polymeric heating element may be designed and specified to accommodate a maximum particular watt density such as 350 or 500 watts per meter squared, for example. This is generally done by providing a predetermined and specified amount of carbon (or other conductor) to correspond to the desired watt density. Accordingly, as the heat in the carbon polymeric heating element 16 rises, the resistance consequently increases, thereby reducing the current in the specific area of heat increase.

In accordance with yet another embodiment of the present invention, the heating element 16 is characterized as self-regulating. The term "self-regulating" will be understood to mean that the resistivity and the thermal coefficient of expansion of the heating resistive element or conductive element 116 of the heating element 16 has a first resistivity and a first thermal coefficient of expansion that is less than the second resistivity and the second thermal coefficient of expansion of the insulator 216 of the heating element 16. As a consequence, and as best understood, when the temperature increases at any portion of the heating element 16, the resistance of the heating element 16 therefore increases and the current is reduced to automatically adjust for a temperature increase. Once the temperature dissipates at a "hot" point(s), the current automatically increases as the overall resistance of the heating element 16 decreases to again provide the power needed to ensure uniform heating across the blanket 11. The term "self-regulate" is also meant to convey that when the temperature in any portion of the heating element 16 increases to a predetermined temperature, at any point within the heating element 16, the insulation 216 expands to separate the aggregate constituents of the conductive element 116 entrained thereon or therein, whereby the resistance to the current flow is automatically increased and the current is therefore decreased, until the temperature is decreased at the "hot" point(s).

In accordance with the present invention, the polymeric heating element 16 is provided which consists of the following essential components: (1) one or more resistive or conductive materials 116, (2) an insulating material 216; and (3) a nonconductive carrier material 316.

It has been found that for the three essential components of the polymeric heating element 16, the following characteristics are important. The conductive element or resistive substance 116 may be one having either a negative or positive temperature coefficient. Any materials with relatively good electrical conductivity which do not vary substantially upon change in air or moisture conditions or temperatures of up to about 300 C. are suitable. Non-limiting examples of resistive substances or conductive materials 116 include carbon materials such as graphite, carbon black, and lamp black; silicon; germanium; metal particles such as a metal powder of copper, iron, zinc, magnesium, etc.; heating wire alloys such as Constantan and Nickeline and alloys such as Monel metal and Phosphor-bronze. If desired the resistive material 116 may be a mixture of two or more resistive substances.

The insulating material 216 may be a solid substance which is meltable below the operating temperature of the polymeric heating element 16. An example of such an insulating material 216 is acetyl cellulose sold under the trademark Cellon. It is also possible to use as the insulating material 216 a solid material such as glass powder, finely divided bentonite, flint, etc.

The non-conductive carrier material 316, which is a plastic, may be selected from any one of the exemplary following class of materials:
  (a) Polymers of alpha-olefins such as polyethylene, polypropylene, polyisobutylene, polystyrene, etc.
  (b) Copolymers obtained by polymerizing two different alpha-olefins such as defined in (a).
  (c) Halogenated vinyl polymers and copolymers, such as, for example, polyvinyl chloride, copolymers of vinyl chloride with vinyl acetate, styrene, propylene, etc.
  (d) Polyesters, preferably unsaturated polyesters. These polyesters are plastic materials derived from the polymerization of esters in the presence of a peroxide which acts as a . . . hardener. These esters are obtained by reacting an unsaturated dicarboxylic acid with a divalent alcohol. Examples of suitable polyesters are Palatal P5 and Palatal P6.
  (e) Polyamides, e.g., Versamid (a condensation product of dimerized and trimerized unsaturated fatty acids, in particular linolic acid with polyamines).
  (f) Other materials such as polyacrylonitrile, polymeric vinyl amines and phenol waxes may also be employed as the non-conductive carrier material 316.

Ultimately, the heating element 16 is fixed across a substantial area of the blanket 11 to co-extend across the area "A" defined by either the front panel 12a or the inner panel 12b, but internally of the blanket 11. In one embodiment, a fixing means or fastener 20 may fix the heating element 16 to span across the area of the blanket 11 by providing a plurality of attachment zones at various locations of the heating element 16. Migration or general movement of the heating element 16 during use of the blanket 11 is thereby prevented or substantially prevented to ensure a continual uniform heating across the area of the blanket. The fixing means 20 may be a plurality of fasteners 20 such as heat-resistant fasteners that extend through panel 12a through the heating element 16 and ultimately through panel 12b wherein the heating element 16 is then secured in place in a known way, such as by shank rivets, lock and key fasteners, button fasteners, bayonet fasteners, and other known suitable fasteners. Alternatively, another fixing means 20 may simply be a plurality of stitches, where each attachment zone is defined by a stitching that extends through the peripheral area of the polymeric heating element 16, preferably containing no deposition of conductive material 116, and then attaches/sews the heating element 16 to panel 12a and/or 12b. The plurality of attachment zones that define the fixing means 20 may preferably be configured to support the heating element 16 at least at a top left area or corner 12c and top right area or corner 12d, and at least at a bottom left area or corner 12e and a bottom right area or corner 12f. Accordingly, when the term "corner" is used herein, it refers to a general area proximate to the actual corner of the blanket. Yet another alternative to the fixing means 20 may simply be an adhesive backing applied to the heating element 16 that then fixes the heating element on the foil layer 14, again across the surface area 12c defined by 12a or 12b. It will be appreciated that any fixing means 20 may be employed that retains the heating element 16 in a position that is substantially co-extensive with the area of the blanket 11 as defined by panel 12a or panel 12b.

As shown in FIGS. 1 and 3, an optional first thermostat 24 may electronically communicate with the electrical supply and the interior of the blanket 11, thereby controlling the temperature of the blanket 11 responsive to other control parameters described below or as otherwise known. One control parameter may be the surface of a container 21 to be warmed and temperature-controlled for example. Accordingly, the thermostat 24 is configured in a known manner to measure the temperature of the surface of the container or some other appropriate control surface and to switch on the electrical power supplied to the heating element 16 once the temperature is reduced below a preset temperature range.

A second optional thermostat 25 including a temperature sensor such as a thermocouple (not shown) may be included wherein the second thermostat 25 may be submerged within a fluid 23 contained within the container 21. Stated another way, the second thermostat 25 may thermally communicate with an article 27 such as container 21 and/or fluid 23 to be heated. Other "articles" that may be heated include concrete, floors, or work mats for example. As the fluid temperature fluctuates, either colder or hotter, the thermostat 25 by and through its sensing means may then, based on a preset temperature range for example, electronically communicate with the power supply in a known way, to complete or interrupt the power supply to the blanket 11, thereby providing a secondary heat control of a blanket heating system 10 in accordance with the present invention.

Stated another way, the blanket 11 may be adapted to thermally respond to a thermostat 25 in thermal communication with an article 27 to be heated. It will be appreciated that the temperature of the blanket controlled by the first thermostat 24 may be markedly different than the temperature of the bulk fluid or substrate that may optionally be controlled by the second thermostat 25. For example, it may be necessary to heat the blanket to a relatively greater temperature to provide the necessary heat transfer to the fluid 23, thereby controlling the fluid at a relatively lower temperature. Probe immersion thermostats providing sensor temperature control may be provided by companies such as DeVale Industries of Buford, Georgia, United States of America. Certain probe immersion thermostats provided by DeVale for example, are thermally sensitive bi-metallic switch assemblies that provide reliable control of fluids and air.

An in-line ground fault circuit interrupter (GFCI) 26 may be employed as a safety precaution and to ensure that the risk of electrical shock is mitigated or eliminated. As shown in FIG. 1, the GFCI may be simply hard-wired or connected to the power supply 18 and to the blanket 11, thereby interrupting electrical power in the event of a hazardous condition such as a wetting of the blanket 11 for example.

A fourth layer 28 may be provided and contains an EVA foam insulation layer 28 that provides a cushion about the vessel to be wrapped, and also provides an insulation to save power needed to heat the bulk fluid contained within an associated vessel 21, shown in FIG. 3. Again, other substrates or materials to be heated may include concrete, batteries, and other areas exposed to relatively cold conditions.

Finally, the inner panel 12b covers the foam layer 28 and is attached to the outer panel 12a by stitching or heat-sealing inner panel 12b to the outer panel 12a, thereby providing a sealed blanket 11. Other sealing means may be employed if desired. Ultimately, a blanket 11 is provided that exhibits uniform heating across its area in a manner heretofore not realized.

The outer panel 12a may contain straps or other restraining means (not shown) that may be used to strap the blanket 11 about the vessel (not shown). It will be appreciated that as known in the art, the blanket may be sized and shaped to accommodate a myriad of shapes of vessels. Alternatively, the outer panel 12a may contain grommets or other fasteners that may be used to secure or tie down the blanket 11 on substrates such as concrete, for example.

As shown in FIG. 4, and with regard to other aspects of the invention, the polymeric carbon heating element 16 of the heating blanket may be formed from a polymeric sheet containing conductive carbon or nanocarbon material, such as graphite or carbon black, printed or otherwise deposited onto the polymeric sheet. The polymeric conductive heating element 16 for example only, be provided by Guandong Warmtact Electrical Heating Technology Co., Ltd. of China, or, by other known suppliers in South Korea, for example. For illustrative purposes, the figures provided herein also schematically depict this embodiment as well. In operation, the printed (or otherwise deposited) carbon electronically communicates with the power source 18 and conducts current as in the embodiment described above. In accordance with the present invention, a thermostat 24/25 is not necessary for this embodiment, for the carbon conductive heating element 16 is formed from a self-regulating conductive composite that automatically increases resistance and reduces local current as the temperature increases to predetermined limits or parameters. Other conductors as stated herein may also be utilized in a self-regulating conductive composite, in accordance with the present invention, and as also described herein. When an exemplary upper temperature parameter is reached, the heating element 16 increases the resistance and thereby reduces current, thereby safely regulating the maximum heat that the heated blanket 11 will generate at the high-temperature region of the blanket 11.

In yet another aspect of the polymeric conductive heating element 16, and as exemplified by FIG. 4, the blanket 11 may be formed by merely stacking the heating element 16 between layers 12 and 14, as described herein. In one embodiment, the inherent rigidity of certain non-conductive polymeric materials 316, containing the carbon heating material 116 and the insulating material 216, facilitates minimal physical migration once the heating element 16 is fully contained within the finished blanket 11. Accordingly, after electrically attaching a power cord 19 to the heating element 16, the vinyl outer layers 12 may be heat welded about the periphery 13 of the blanket 11 to thereby seal the various blanket layers such as layers 14 and 16 within the outer case 12 or layers 12a and 12b.

Stated another way, the present invention may include a blanket 11 containing: a first outer panel 12a defining an area 12c; a self-regulating polymeric heating element 16 proximate to the first outer panel 12a and substantially coextensive with the area 12c defined by the first outer panel 12a; a power source in electronic communication with said self-regulating heating element 16; and a second outer panel 12b proximate to the self-regulating heating element 16 and substantially coextensive with the area 12c defined by the first outer panel 12a and heat welded thereto, wherein the first outer panel 12a and the second outer panel 12b contain the self-regulating heating element 16 to prevent substantial movement thereof. Accordingly, in one embodiment, the self-regulating polymeric heating element 16 is formed from a conducting element, an insulating element, and a rigid non-conductive element, said conducting element disposed upon or within said rigid non-conductive element and said insulating element.

Accordingly, a process of manufacturing the present blanket, and a product formed by such a process is also contemplated in the present invention.

In yet another aspect of the invention, the heating element 16 may be customized to produce a maximum wattage per square meter. By correlating the predetermined amount of carbon (or other conductor) to the desired watt density, the maximum watt density can be controlled. Power as measured in Wattage (W) equals current (amps, I) multiplied by voltage (volts, V):

$$W = I \times V$$

We know that:

$$V = I \times R, \text{ so}$$

$$W = I^2 R$$

Accordingly, a predetermined amount of carbon such as carbon black or graphite 116 may be deposited on the polymeric sheet 316 (such as polyethylene containing an insulator 216 such as ground glass), to form a polymeric carbon conductive heating element 16 having a maximum wattage density such as 350 or 550 watts/m$^2$, for example, wherein the maximum heat of either density is 50 C or 70 C, respectively. Stated another way, in one preferred embodiment of the present invention, a carbon or nanocarbon polymeric heating element 16 is self-regulating in that as the temperature increases, the resistivity of the carbon heating element 116 decreases to thereby maintain the temperature at the design temperature by consequently reducing heat caused by increased resistivity of the polymeric heating element 16. In one aspect of this embodiment, a portion of the carbon-containing heating element may be interrupted such as by a tear for example. Nevertheless, the carbon-containing conductor will still conduct and heat up until and about the point or portion of the tear. In this way, the blanket 11 will still heat even though it is impaired by a tear or a general breach in the carbon-containing conductive element 116.

In sum, the present invention may be characterized as a heatable blanket containing a first cover panel 12a; a second layer/foil layer 14 adjacent/juxtaposed to the first cover panel 12a; a self-regulating heating/conducting element 16 adjacent/juxtaposed to the second layer 14 and fixed across and substantially co-extensive with the area defined by the first cover panel 12a; a power source 18 electronically communicating with the heating element 16; and a second cover panel 12b attached to the first cover panel 12a. The constituents or components of the present invention are off-the-shelf items and may be supplied by known manufacturers. Various references that disclose related items may be described in U.S. Pat. Nos. 3,412,358, 5,931,343, 3,668,367, 7,880,121, and 7,851,729, wherein the teachings of each reference are herein incorporated by reference as if fully stated.

It will be appreciated that the various embodiments and features described herein are merely illustrative and exemplary, and are not meant to limit the invention. As such, the invention should be given full breadth consistent with the range of equivalents that may be found relative to each constituent, consistent with the appended claims.

What is claimed is:

1. A blanket comprising:
a first outer panel defining a first area;
a self-regulating heating element proximate to said first outer panel and extending within a second area coextensive with the first area of the first outer panel, said self-regulating heating element formed as a polymer sheet;
an insulating layer provided between said first outer panel and said self-regulating heating element;
a power source in sole electronic communication with said self-regulating heating element within said blanket; and
a second outer panel proximate to said self-regulating heating element and coextensive with the first area defined by the first outer panel, and joined to said first outer panel;
wherein said first outer panel and said second outer panel contain said self-regulating heating element, and
wherein said self-regulating heating element has a maximum wattage density of 350-500 watts per square meter, and said self-regulating heating element consists of a conducting element, an insulating element, and a rigid non-conductive element, said conducting element disposed upon or within said rigid non-conductive element and said insulating element.

2. The blanket of claim 1 wherein said self-regulating heating element is formed from carbon deposited onto or within said polymeric sheet.

3. The blanket of claim 1 wherein said self-regulating heating element has a first resistivity and a first thermal expansion coefficient, and said insulating element has a second resistivity and a second thermal expansion coefficient, said first resistivity and said first thermal expansion coefficient less than said second resistivity and said second thermal expansion coefficient, respectively.

4. The blanket of claim 1 wherein said self-regulating heating element is contained within said first and second outer panels by heat-welding said first and second panels about the periphery of each of said panels.

5. The blanket of claim 1 wherein the conductive element has either a negative or positive temperature coefficient.

6. The blanket of claim 1 wherein the conductive element has the same conductivity up to about 300 C.

7. A blanket comprising:
a first outer panel defining a first area;
a self-regulating heating element proximate to said first outer panel and extending within a second area coextensive with the first area of the first outer panel;
a power source in sole electronic communication with said self-regulating heating element within said blanket; and
a second outer panel proximate to said self-regulating heating element and extending within a third area coextensive with the first area of the first outer panel, and joined to said first outer panel, wherein said first outer panel and said second outer panel contain said self-regulating heating element, wherein said self-regulating heating element comprises a conducting element, an insulating element, and a non-conductive polymeric carrier, wherein said conducting element has a first resistivity and a first thermal expansion coefficient, and said insulating element has a second resistivity and a second thermal expansion coefficient, said first resistivity and said first thermal expansion coefficient less than said second resistivity and said second thermal expansion coefficient, respectively, and, wherein the self-regulating conductive heating element has a maximum wattage density of 350-500 watts per square meter.

8. The blanket of claim 7 wherein said conducting element is selected from at least one of the members selected from the group of carbon materials, silicon, germanium, metal particles, heating wire alloys, alloys, and mixtures thereof.

9. The blanket of claim 7 wherein said conducting element is selected from at least one of the members selected from the group of graphite, carbon black, carbon lamp black, silicon, germanium, copper, iron, zinc, magnesium, and heating wire alloys selected from Constantan and Nickeline, and alloys selected from Monel metal and Phosphor-bronze.

10. The blanket of claim 7 wherein the insulating element is selected from a material which is meltable below the operating temperature of the self-regulating heating element.

11. The blanket of claim 10 wherein the insulating element is selected from a plastic, polymer, glass powder, bentonite, flint, and mixtures thereof.

12. The blanket of claim 10 wherein the insulating element is acetyl cellulose.

13. The blanket of claim 7 wherein the non-conducting carrier element is selected from polymers of alpha-olefins, copolymers of two different alpha-olefins, halogenated vinyl polymers and co-polymers, polyesters, unsaturated polyesters, polyamides, and polyacrylonitriles.

14. The blanket of claim 13 wherein the non-conducting carrier element is selected from polymers of alpha-olefins selected from polyethylene, polypropylene, polyisobutylene, and polystyrene, and copolymers thereof; halogenated vinyl polymers and co-polymers selected from polyvinyl chloride, copolymers of vinyl chloride with vinyl acetate, styrene, and propylene; polyesters and unsaturated polyesters selected from plastic materials derived from the polymerization of esters in the presence of a peroxide which functions as a hardener, wherein the esters are obtained by reacting an unsaturated dicarboxylic acid with a divalent alcohol; polyamides selected from condensation products of dimerized and trimerized unsaturated fatty acids; and polyacrylonitrile, polymeric vinyl amines and phenol waxes.

15. A blanket comprising:
a first outer panel defining a first area;
a self-regulating polymeric heating element proximate to said first outer panel and coextensive with the first area defined by the first outer panel;
a power source in sole electronic communication with said self-regulating heating element within said blanket; and
a second outer panel proximate to said self-regulating heating element, and, coextensive with the first area defined by the first outer panel and heat welded thereto,
wherein said first outer panel and said second outer panel contain said self-regulating heating element to prevent substantial movement thereof, and,
wherein the self-regulating polymeric heating element has a maximum wattage density of 350-500 watts per square meter.

16. The blanket of claim 15 wherein the self-regulating polymeric heating element is formed from a conducting element, an insulating element, and a rigid non-conductive element, said conducting element disposed upon or within said rigid non-conductive element and said insulating element.

17. The blanket of claim 16 wherein the conducting element is selected from the group containing carbon, silicon, germanium, metal particles, heated wire alloys, alloys, and mixtures thereof.

18. The blanket of claim 16 wherein the insulating element is selected from a material which is meltable below the operating temperature of the self-regulating heating element, and, wherein the insulating element is selected from a plastic, polymer, glass powder, bentonite, flint, and mixtures thereof.

19. The blanket of claim 15 wherein the self-regulating heating element contains carbon.

20. The blanket of claim 15 wherein the self-regulating heating element contains a rigid polymer containing carbon and an insulator.

* * * * *